(12) United States Patent　　(10) Patent No.: US 7,564,353 B2
Stevens et al.　　(45) Date of Patent: Jul. 21, 2009

(54) AUDITABLE AUTHENTICATION OF EVENT HISTORIES FOR SHIPPED AND STORED OBJECTS

(75) Inventors: John K. Stevens, Stratham, NH (US); Paul Waterhouse, Selkirk, CA (US); Jason August, Toronto, CA (US)

(73) Assignee: Visible Assets, Inc., Mississauga, Ontario (CA)

( * ) Notice: Subject to any disclaimer, the term of this patent is extended or adjusted under 35 U.S.C. 154(b) by 175 days.

(21) Appl. No.: 11/164,213

(22) Filed: Nov. 15, 2005

(65) Prior Publication Data

US 2006/0293977 A1　　Dec. 28, 2006

Related U.S. Application Data

(60) Provisional application No. 60/627,984, filed on Nov. 15, 2004.

(51) Int. Cl.
*G08B 13/14* (2006.01)

(52) U.S. Cl. ............. 340/572.1; 340/572.4; 340/539.13

(58) Field of Classification Search ............. 340/572.1, 340/572.4, 571, 539.1, 539.13, 438, 439, 340/442, 5.2, 10.3, 10.33; 701/29, 32, 33
See application file for complete search history.

(56) References Cited

U.S. PATENT DOCUMENTS

| 4,750,197 | A | 6/1988 | Denekamp et al. |
| 6,294,997 | B1 | 9/2001 | Paratore et al. |
| 6,745,027 | B2 | 6/2004 | Twitchell, Jr. |
| 7,089,099 | B2 * | 8/2006 | Shostak et al. ................. 701/32 |
| 7,103,460 | B1 * | 9/2006 | Breed .......................... 701/29 |
| 7,161,476 | B2 * | 1/2007 | Hardman et al. ............. 340/442 |
| 2004/0233054 | A1 * | 11/2004 | Neff et al. |
| 2006/0164232 | A1 * | 7/2006 | Waterhouse et al. ......... 340/506 |

FOREIGN PATENT DOCUMENTS

KR　　2004/008948　　*　1/2004

* cited by examiner

*Primary Examiner*—Van T. Trieu
(74) *Attorney, Agent, or Firm*—Larson & Anderson, LLC

(57) ABSTRACT

This invention relates to a method and system for auditably authenticating the histories of events (e.g. temperature levels) experienced by objects (e.g. pharmaceutical products, foodstuffs, etc.) during storage in repositories such as warehouses and movable shipping vehicles. The method involves a) sensing an event experienced by an object; b) recording an event signal that defines the sensed event; c) transmitting a temporally ordered series of the event signals to a data storage apparatus, the data storage apparatus being operable to store the temporally ordered series of the event signals; and d) safeguarding the aforesaid data storage apparatus against alteration of the stored series of event signals.

39 Claims, 10 Drawing Sheets

AUDITABLE AUTHENTICATION OF EVENT HISTORIES FOR SHIPPED AND STORED OBJECTS

CROSS-REFERENCE TO RELATED APPLICATIONS

This application claims priority from and incorporates by reference, U.S. application Ser. No. 60/627,984 filed Nov. 15, 2004.

FIELD OF THE INVENTION

This invention relates to a method and system for authenticating the histories of events (e.g. temperature levels) experienced by objects (e.g. pharmaceutical products, foodstuffs, etc.) during storage in repositories such as warehouses and movable shipping vehicles.

BACKGROUND OF THE INVENTION

The pharmaceutical and other industries are heavily regulated by many standards worldwide. Many of these regulations are intended to prevent spoilage of valuable pharmaceuticals and food items due to prolonged exposure to unacceptably high temperatures, to contaminating atmospheres, or the like. For example, the Food and Drug Administration (FDA) of the United States regulates all quality control and details associated with manufacturing and production of pharmaceuticals. Many of these drugs must be kept within a narrow temperature range, most often 2 to 8° C., during shipment and storage. These drugs are stored in refrigerated warehouses, and often shipped in large trucks that also have carefully controlled refrigeration systems. A single shipment of drugs can be worth many millions of dollars and maintaining the drugs within this narrow temperature range becomes a critical issue. The Food and Drug Administration requires proof that a drug has been maintained within this narrow temperature range up to the time of sale.

Currently, warehouses and trucks are checked periodically using small reference battery-operated temperature sensor tags that log the temperature (for example, upon an internal read-write memory for subsequent reading and then re-use for storage of new readings). Such sensor tags, under the name Spectrum 2000, are available from Veriteq Instruments, Inc. of Richmond, British Colombia, in Canada. These sensors are placed at strategic places within a truck or a warehouse and the temperature over time is monitored. The sensor tags are removed from the warehouse and plugged into a computer where the data logging is harvested (read) and stored on a desktop computer system. The logger tags may then be reused. Proof must be maintained that each tag is accurate to within 0.25° C., and that the temperature tag has been recently calibrated. In addition, the software used to read the tag has many special features that seek to guarantee the data log has not been altered. As a result such reusable tags can cost between $300-$500 each, and the software and overhead of managing the data log and printouts can be quite expensive. As a result, current methods provide for event tracking of large groups of stored objects (e.g. an entire repository, such as a truck or warehouse), rather than smaller groups or even individual items. If an unacceptable temperature variation is detected at the sensor tag, the prior-art system requires destruction of a large group of items associated with that tag.

It would thus be desirable to provide a system that dramatically reduces costs and makes possible real-time tracking of temperatures (or other events) for warehouses, as well as trucks and other repositories, on a routine basis and for virtually every item (e.g. on a pallet basis or any other basis) that is contained in the truck or in the warehouse.

In the context of the present invention, the term "repository" shall be construed broadly to embrace all means of storage and shipment, including a warehouse, truck, airplane, oceangoing ship, and containers used for the foregoing. Moreover, the stored "objects" should be construed broadly to encompass all manner of goods, including pharmaceuticals, foodstuffs, wines and all other items whose condition responds to negative (e.g. high temperatures) or even positive events which they may experience.

The FDA has published a detailed specification (Guidance for Industry—Part 11, Electronic Records; Electronic Signatures—Scope and Application, August, 2003) for data logging and audit methods that aim to prove that the environmental event data has not been altered. The August/2003 FDA Guidance states at page 6 that the FDA "intends to exercise enforcement discretion regarding specific part 11 requirements related to computer-generated, time-stamped audit trails . . . . Persons must still comply with all applicable predicate rule requirements related to documentation of, for example, date . . . , time, or sequencing of events, as well as any requirements for ensuring that changes to records do not obscure previous entries." This auditable authenticity of event histories is particularly critical in the pharmaceutical industry where an individual truck may contain many millions of dollars worth of freight and if the temperature strays outside the critical range for only four hours, then all the freight in the truck must be destroyed. Clearly, individuals involved in handling the event data may have a motivation to alter the data. Therefore, the audit trail and traceability of the audit trail is critical for a temperature tracking system.

SUMMARY OF THE INVENTION

The present invention broadly provides a method for preventing alteration of event histories for objects held in a repository (e.g. a fixed warehouse or a movable vehicle) for a period of time, said objects (e.g. pharmaceutical materials) being sensitive to events (e.g. temperature levels) experienced thereby, said method comprising:

a) sensing an event experienced by a said object;

b) recording an event signal that defines the sensed event;

c) transmitting a temporally ordered series of said event signals to a data storage apparatus, said data storage apparatus being operable to store said temporally ordered series of said event signals; and d) safeguarding said data storage apparatus against alteration of said stored series of event signals.

According to one preferred embodiment, safeguarding step (d) is carried out by selecting a data storage apparatus which is operable to store said series of event signals upon a medium that cannot be readily altered without detection, such as a write-once-only CD-R disc. Such use of an unalterable medium (e.g. CD-R) is especially appropriate where the repository is movable, such as a truck or railway car, since a CD-R drive can easily be located within the movable repository during shipment of the goods which are sensitive to temperature or other environmental events.

According to another preferred embodiment, safeguarding step (d) can be carried out by disposing the aforesaid data storage apparatus at a secure location (e.g. KPMG or other auditor's offices) distant from said object. Moreover, the event data can be transmitted (wirelessly for movable repositories, by wired connection for a stationary repository such as a warehouse) to the distant location immediately, as the events occur (i.e. in "real time"), so that the event data is in secure hands (e.g. an independent auditor's) before it could possibly be altered.

Preferably, the aforesaid safeguarding step (d) will utilize a selected algorithm to calculate a pair of checksums based on a selected sequence of event signals, said pair of checksums having a selected relationship (e.g. being identical) in the event of data integrity, one of the two checksums being calculated from event signals generated at the repository (e.g. at a warehouse), the other checksum being calculated from event signals that have already been transmitted to the aforesaid data storage apparatus.

Preferably, safeguarding step (d) comprises storage of corresponding temporal (e.g. date/time) data together with each said event signal, said temporal data being obtained from an independent source (e.g. National Institute of Standards and Technology (NIST)). These independent sources of date and time should be understood to include the readily available AM and FM signal sources, as well as global positioning system (GPS) satellites.

Where the aforesaid repository is a vehicle operable for delivery of event-sensitive drugs or other objects, the aforesaid independent source can conveniently be a GPS satellite, which normally provides accurate clock signals along with position signals for pickup by a GPS receiver located in the vehicle.

According to a preferred embodiment, sensing step (a) and recording step (b) are carried out by associating (e.g. attaching to) a tag with a said object, said tag comprising an event sensor operable to record an event signal for describing an event experienced by said object, a data storage device operable to store data comprising identification data for identifying said radio frequency tag, said tag being operable to provide data signals comprising said event signal and an identification signal based upon said identification data, and an energy source for activating said event sensor and said data storage device.

Preferably, a plurality of such tags may be disposed in different areas of the vehicle to sense different events (e.g. different temperatures) experienced in said different areas (e.g. at back of truck near a frequently opened door, as well as on individual batches of drugs).

According to a preferred embodiment, recording step (b) may be carried out in an unalterable manner, as by providing the tag with a write-once-only data storage device (e.g. A PROM memory), on which the event signals may be recorded for subsequent external transmission (wirelessly or by cable) and harvesting.

According to a preferred embodiment, the inventive method for preventing alteration of event histories for objects held in a repository (e.g. warehouse or movable vehicle) for a period of time, said objects (e.g. pharmaceutical materials) being sensitive to events (e.g. temperature levels) experienced thereby, comprises the steps of:

a) associating (e.g. attaching to) a radio frequency (RF) tag with a said object, said tag comprising an event sensor operable to record an event signal for describing an event experienced by said object, a data storage device operable to store data comprising identification data for identifying said radio frequency tag, a tag antenna operable at a radio frequency, a tag transmitter operatively connected to said tag antenna, said tag transmitter being operable at said radio frequency to transmit data signals comprising said event signal and an identification signal based upon said identification data, and an energy source for activating said event sensor and said tag transmitter;

b) reading said data signals, which comprise said event signal and said identification signal, from said tag transmitter of said RF tag; and c) transmitting said data signals to a data storage apparatus, said data storage apparatus being operable to store a temporally ordered sequence of said event signals from said RF tag upon a medium which cannot be readily altered without detection.

Where the data storage apparatus is disposed at a secure location distant from the aforesaid object and its repository, the transmitting step (c) may further comprise transmitting the aforesaid sequence of event signals together with corresponding identification signals to said data storage apparatus.

The invention further broadly provides a system for preventing alteration of event histories for objects held in a repository (e.g. warehouse or movable vehicle) for a period of time, said objects (e.g. pharmaceutical materials) being sensitive to events (e.g. temperature levels) experienced thereby, said system comprising:

a) a tag carried by a said object, said tag comprising an event sensor operable to record an event signal for describing an event experienced by said object, a data storage device operable to store data comprising identification data for identifying said tag, a tag transmitter operable to transmit data signals comprising said event signal and an identification signal based upon said identification data, and an energy source for activating said event sensor and said data storage device; and b) a data storage apparatus in operative communication with said tag, said data storage apparatus being operable to store a temporally ordered sequence of said event signals upon a medium which cannot be readily altered without detection.

Preferably, the system further comprises a central data processor, each tag being connected by cable (e.g. within a warehouse or truck) to the aforesaid central data processor.

According to a wireless preferred embodiment, the aforesaid system comprises:

a) a radio frequency (RF) tag carried by a said object, said tag comprising an event sensor operable to record an event signal for describing an event experienced by said object, a data storage device operable to store data comprising identification data for identifying said radio frequency tag, a tag antenna operable at a radio frequency, a tag transmitter operatively connected to said tag antenna, said tag transmitter being operable at said radio frequency to transmit data signals comprising said event signal and an identification signal based upon said identification data, and an energy source for activating said event sensor and said tag transmitter;

b) at least one field antenna disposed at an orientation and within a distance from said object that permit effective communication with said RF tag at said radio frequency;

c) a reader in operative communication with said field antenna, said reader being operable to receive data signals from said RF tag; and d) a data storage apparatus in operative communication with said reader, said data storage apparatus being operable to store a temporally ordered sequence of said event signals upon a medium which cannot be readily altered without detection.

Preferably, the aforesaid data storage apparatus may be disposed at a secure location distant from said object, with the aforesaid system further comprising:

e) a field transmitter disposed at said repository and operable to transmit said event signals and corresponding location signals to said data storage apparatus.

The aforesaid system desirably comprises a pair of checking devices for utilizing a selected algorithm to calculate a corresponding pair of checksums based on a selected sequence of event signals, the pair of checksums having a selected relationship (e.g. being identical) in the event of data integrity, one of the aforesaid checking devices being disposed at said repository (e.g. at said tag), the other checking device being disposed at said data storage apparatus.

According to a preferred embodiment, the aforesaid system comprises:

a) a radio frequency (RF) tag carried by a said object, said tag comprising an event sensor operable to record an event signal for describing an event experienced by said object, a data storage device operable to store data comprising identification data for identifying said radio frequency tag, a tag antenna operable at a radio frequency, a tag transmitter operatively connected to said tag antenna, said tag transmitter being operable at said radio frequency to transmit data signals comprising said event signal and an identification signal based upon said identification data, and an energy source for activating said event sensor and said tag transmitter;

b) at least one field antenna disposed at an orientation and within a distance from said object that permit effective communication with said RF tag at said radio frequency;

c) a reader in operative communication with said field antenna, said reader being operable to receive data signals from said frequency tag;

d) a geographic position sensing (GPS) detector operable to record a location signal defining a geographic position of said movable repository (e.g. vehicle), and d) a data storage apparatus in operative communication with said reader and said GPS detector, said data storage apparatus being operable to store a temporally ordered sequence of said event signals and corresponding location signals upon a medium which cannot be readily altered without detection.

Preferably, the aforesaid system further comprises:

e) a field transmitter disposed at said movable repository (e.g. vehicle) and operable to transmit said event signals and corresponding location signals to said data storage apparatus.

The system may further comprise a clock operable to generate time signals for transmittal to said data storage apparatus and for storage thereat in correspondence with the aforesaid event signals. This clock may be disposed at the RF tag, or alternatively at the data storage apparatus.

The system preferably comprises a pair of checking devices for utilizing a selected algorithm to calculate a corresponding pair of checksums based on a selected sequence of event signals, the pair of checksums having a selected relationship (e.g. being identical) in the event of data integrity, one of said checking devices being disposed at said movable repository, the other checking device being disposed at a secure location distant from said movable repository. For example, one checking device may be disposed on said RF tag.

According to a preferred embodiment, the aforesaid tag further comprises a tag receiver operable to receive an RF interrogation signal from the aforesaid field antenna, the aforesaid RF interrogation signal being operable to cause said tag to emit an event signal.

Preferably, the movable repository (e.g. vehicle) further comprises a central data processor in operative communication with said field antenna, the aforesaid tag further comprising a tag receiver operable to receive an RF interrogation signal from said field antenna, RF interrogation signal being operable to cause said tag to emit an event signal. Moreover, the identification data preferably comprises an internet protocol (IP) address, and the aforesaid central data processor is operable for communication with an internet router.

Preferably, the aforesaid tag further comprises a display (e.g. LCD) operable to display visible data (e.g. one of the checksums) relating to said event sensor of said tag. The system may comprise a plurality of the aforesaid low frequency (e.g. not exceeding 300 KHz) RF tags and a plurality of low frequency field antennas disposed in different areas of said movable repository and operable to enable discrimination of event signals received from RF tags disposed in different areas of the repository.

Moreover, the aforesaid data storage apparatus may comprise a write-once-only device (e.g. CD-R (or CD-Recordable), PROM) to assure integrity of data relating to events (e.g. high temperature levels) experienced by objects (e.g. packages of pharmaceutical materials).

Lastly, the invention further broadly provides a tag for use in a system for preventing alteration of event histories for objects held in a repository (e.g. warehouse or movable vehicle) for a period of time, the aforesaid objects (e.g. pharmaceutical materials) being sensitive to events (e.g. temperature levels) experienced thereby, the aforesaid tag being adapted for association with (e.g. attachment to) a said object, the tag comprising an event sensor operable to record an event signal for describing an event experienced by the object, a write-once-only data storage device (e.g. PROM) operable to store, in an unalterable manner, data comprising the aforesaid event signal, a tag transmitter operable to transmit data signals comprising said event signal, and an energy source for activating the aforesaid event sensor and the aforesaid write-once-only data storage device.

Preferably, the aforesaid write-once-only data storage device is operable to store identification data for identifying said tag. According to a preferred embodiment, the aforesaid tag further comprises a clock operable to generate time signals for storage at the aforesaid write-once-only data storage device in correspondence with the event signals stored thereat.

DESCRIPTION OF PREFERRED EMBODIMENTS

Figure 1:
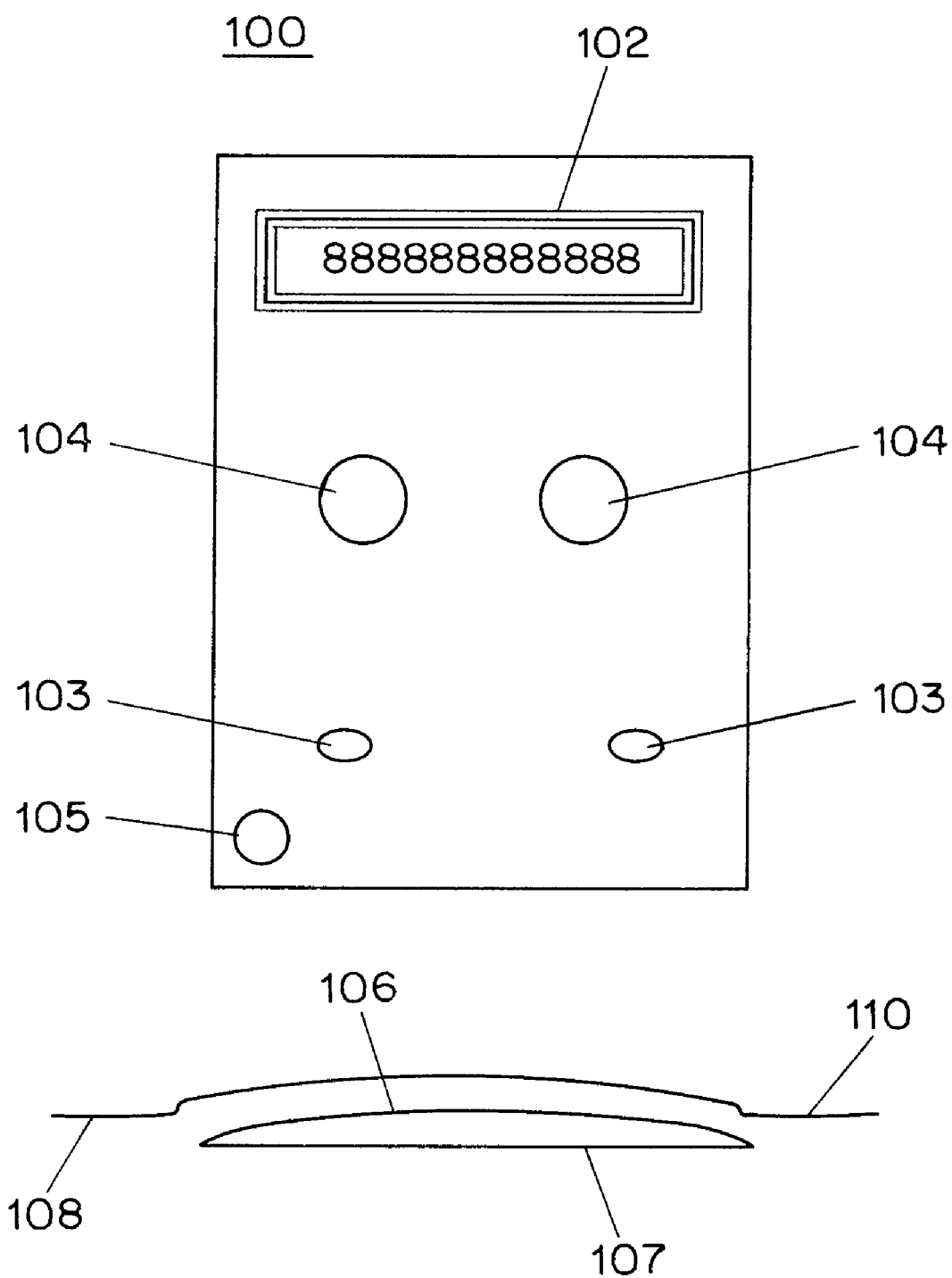
FIG. 1 and FIG. 2 show schematic front and side views of a temperature logging tag 100 that may be used in accordance with the present invention.
Figure 2:
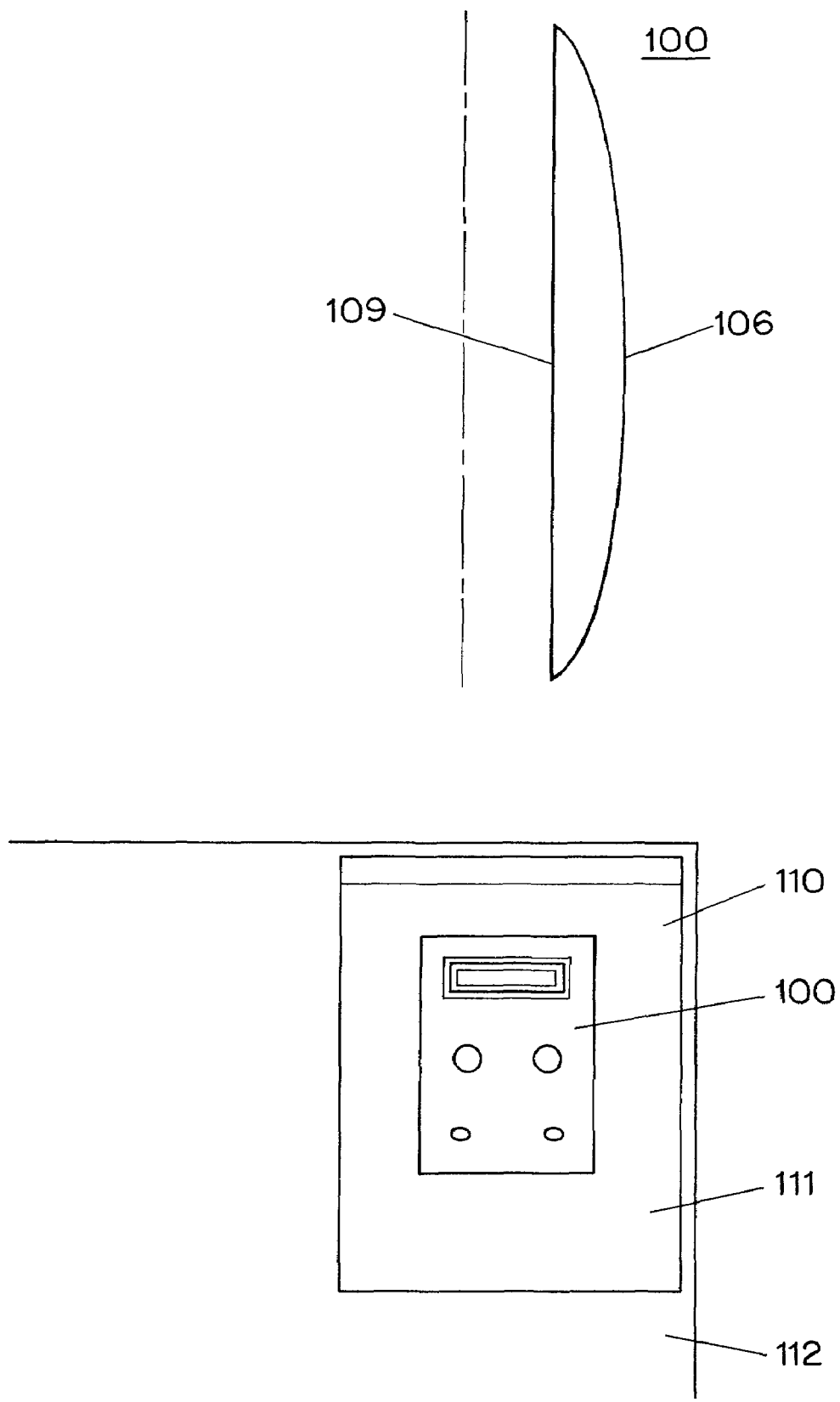
Figure 3:
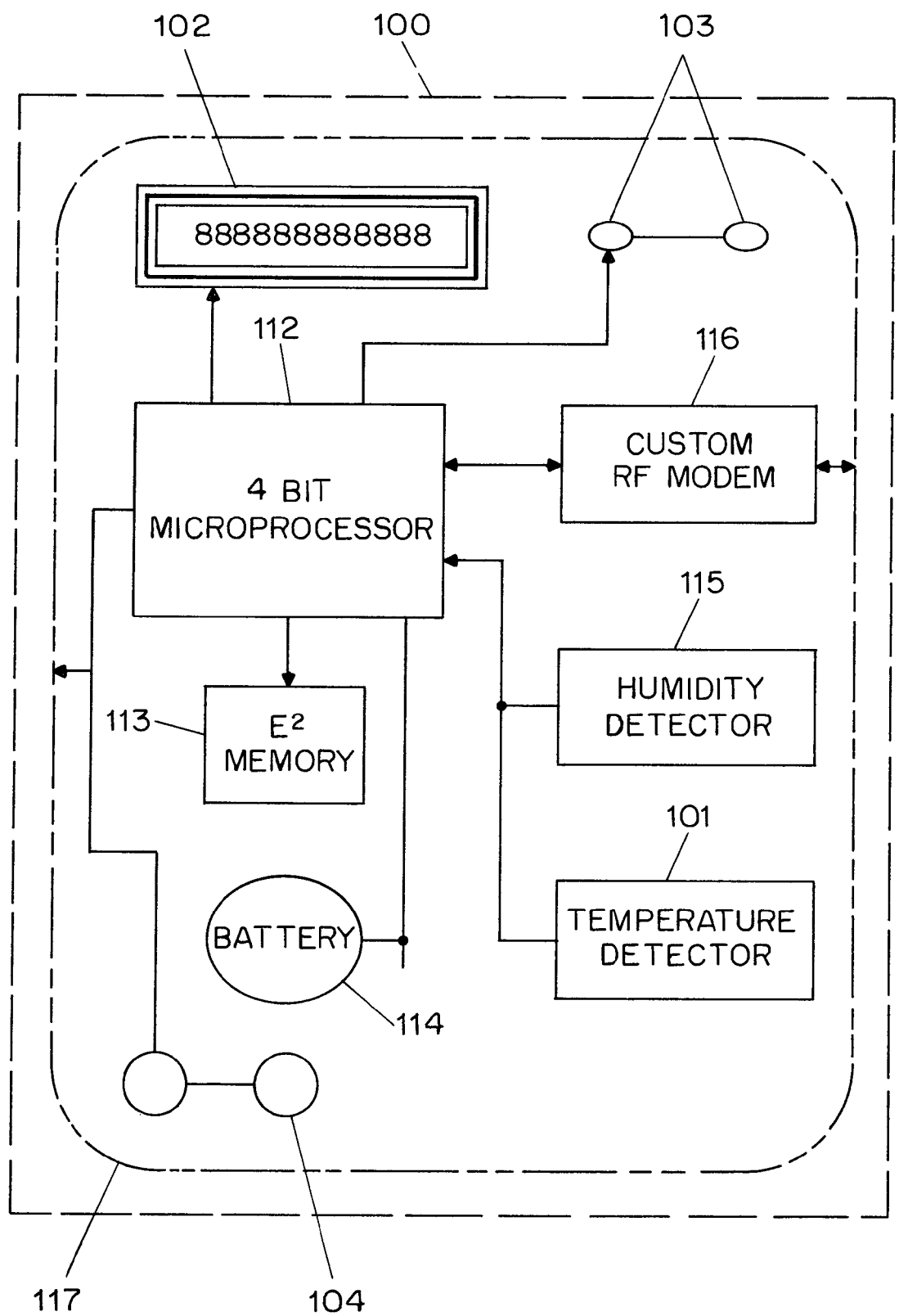
FIG. 3 shows a schematic front view of a damage (from temperature or humidity) alert tag 100 that transmits wirelessly, with its main components displayed. As will be understood, the memory shown in the tag of FIG. 3 may be a write-once-only PROM memory for unalterably storing temperature or other event signals, and optionally identification data.
Figure 4:
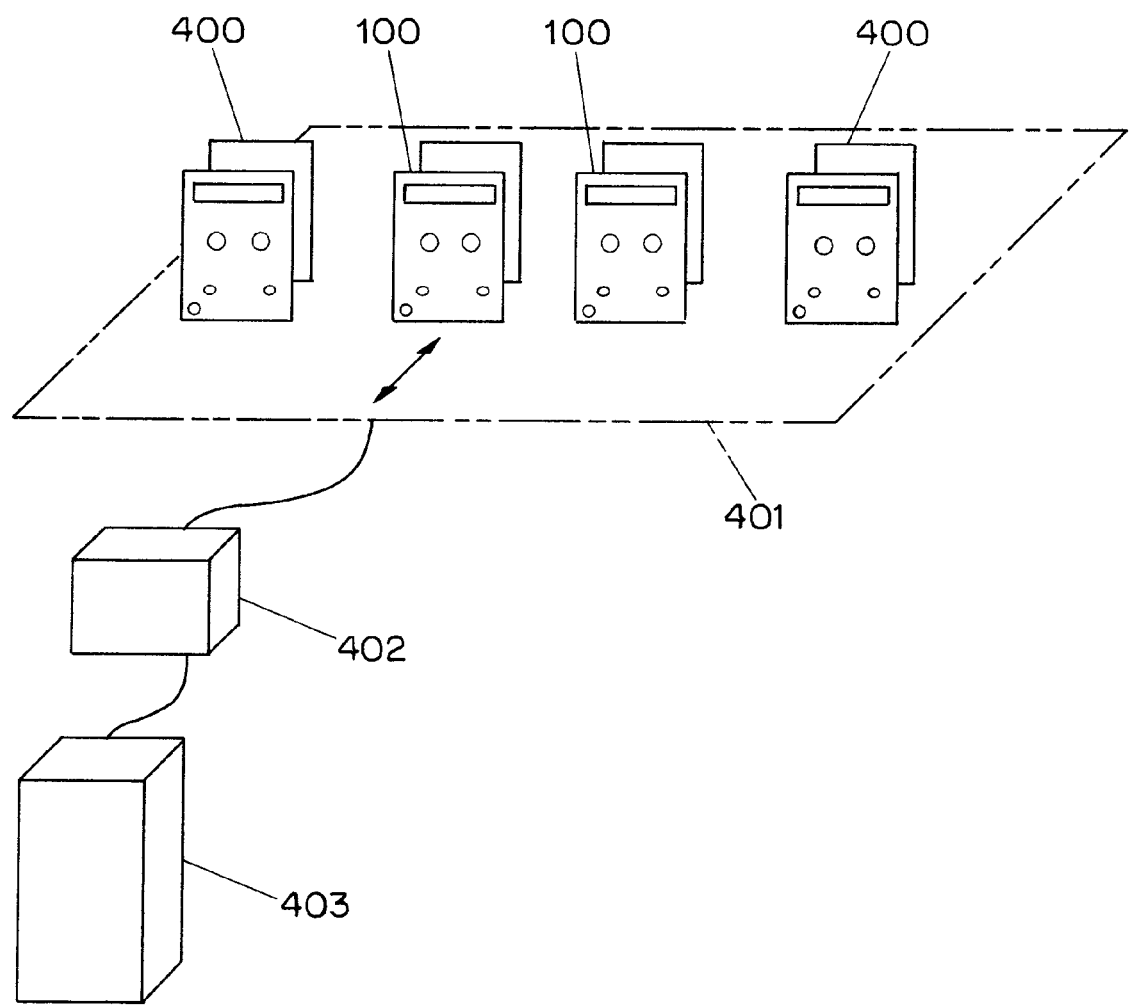
FIG. 4 is a schematic view of a warehouse 400 authenticated by use of a plurality of wireless tags 100, a loop antenna 401, a base station 402, and a server 403 that transmits event data for secure recording on a local data storage system (within the server 403) that uses CD-R discs.
Figure 5:
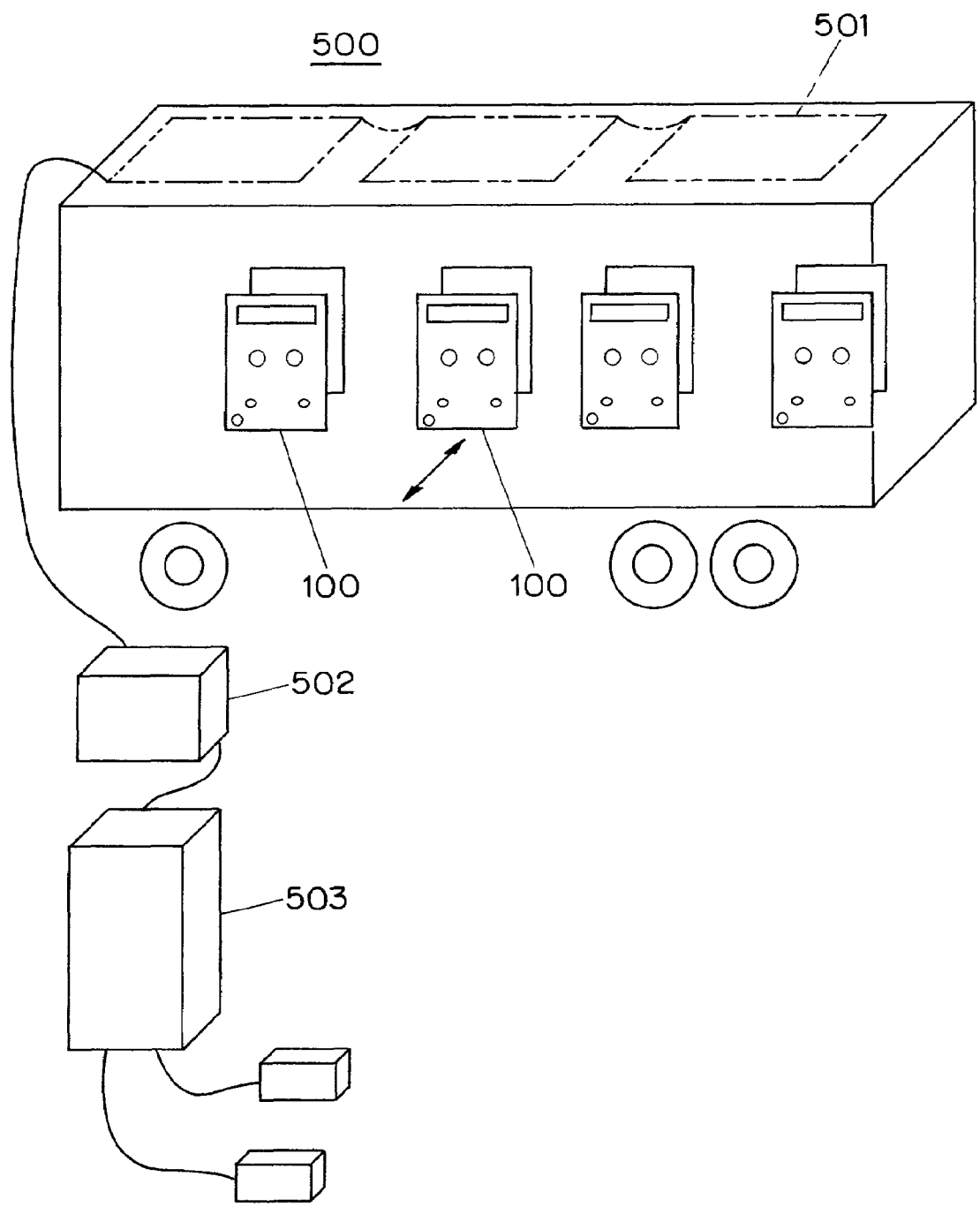
FIG. 5 is a schematic view of a vehicle 500 (e.g. truck or railway car) authenticated by use of a plurality of wireless tags 100, a loop antenna 501, a base station 502, and a server 503 that transmits event data and GPS location and time data for secure recording on a distant data storage system that uses CD-R discs.

A preferred embodiment of the present invention provides a system that comprises a small, low-cost radio frequency (RF) tag 100 as shown in FIGS. 1-3, that contains its own memory, a thermal sensor 101 (e.g. a thermistor), an optional display 102 and optional light emitting diodes 103. As shown in FIGS. 4 and 5, these tags may be placed directly on the side of the box or pallet and continuously record data including the time and the temperature, and write this log to the internal memory. In addition, the tags may be interrogated by a radio frequency transmitter contained in the truck of FIG. 4. This radio frequency system may be based on low-frequency induction and may require loop field antennas 401, 501 placed either in the ceiling or the floor of the truck. These loop antennas may also be used to segregate different regions of the truck, for example the front region, the middle region, etc. and only read tags selectively in those regions. This is particularly critical since the rear of the truck where the doors are open most often may have a totally different temperature profile than the front of the truck.

Figure 6:
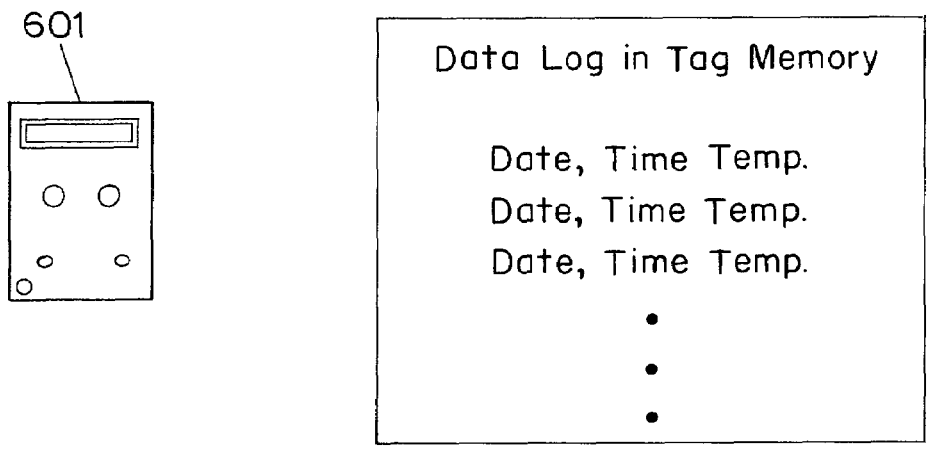
FIG. 6 is a schematic view of a tag 601 that records event (e.g. temperature data) at the drug package within a repository, and of a remotely located ASP 602 and unalterable data storage apparatus using write-once-only CD-R discs 603 to record, in real time, the temporally ordered series of temperatures and corresponding GPS locations, dates, and times of the temperature events experienced at the tag.
Figure 6:
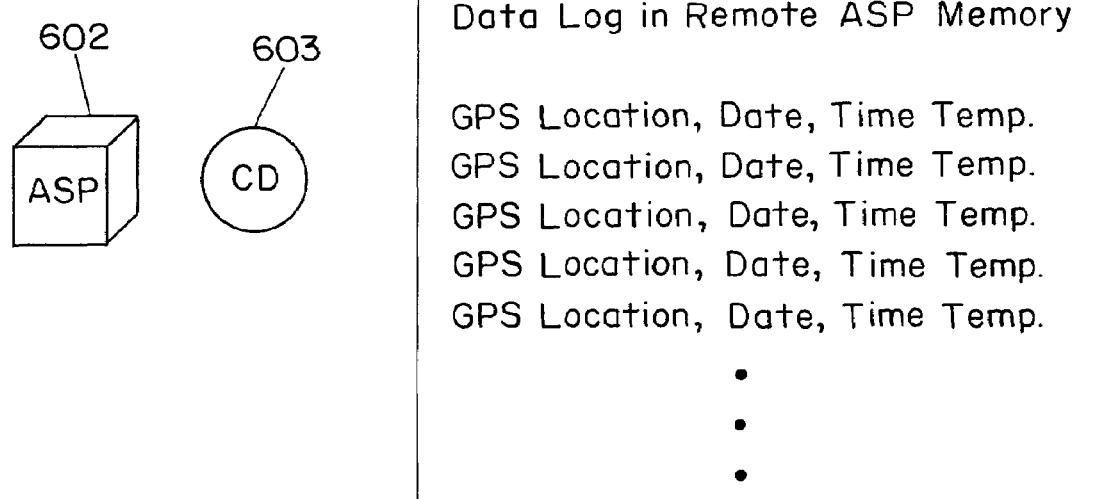

In addition each truck may be equipped with a small computer and a global positioning system (GPS) receiver. As the truck drives along the highway, the computer may interrogate, periodically, the tags in the back of the vehicle, as indicated in FIG. 6. The tags may read the current temperature once a minute, once in 10 minutes, once every three hours etc., and this data may be transmitted via satellite or via cell phone periodically to a centrally located Application Services Provider (ASP) 602. As the data is acquired at the ASP, it may be displayed (see lower part of FIG. 6) on a web-enabled report in real-time with the location of the truck, as determined by a GPS device carried by the truck. In addition, the ASP may write the data log directly to a CD 603 in real-time. This CD can be a write-only device so the log is prominent, cannot be tampered with, and has been recorded away from the truck by an independent auditor in real-time.

Figure 7:
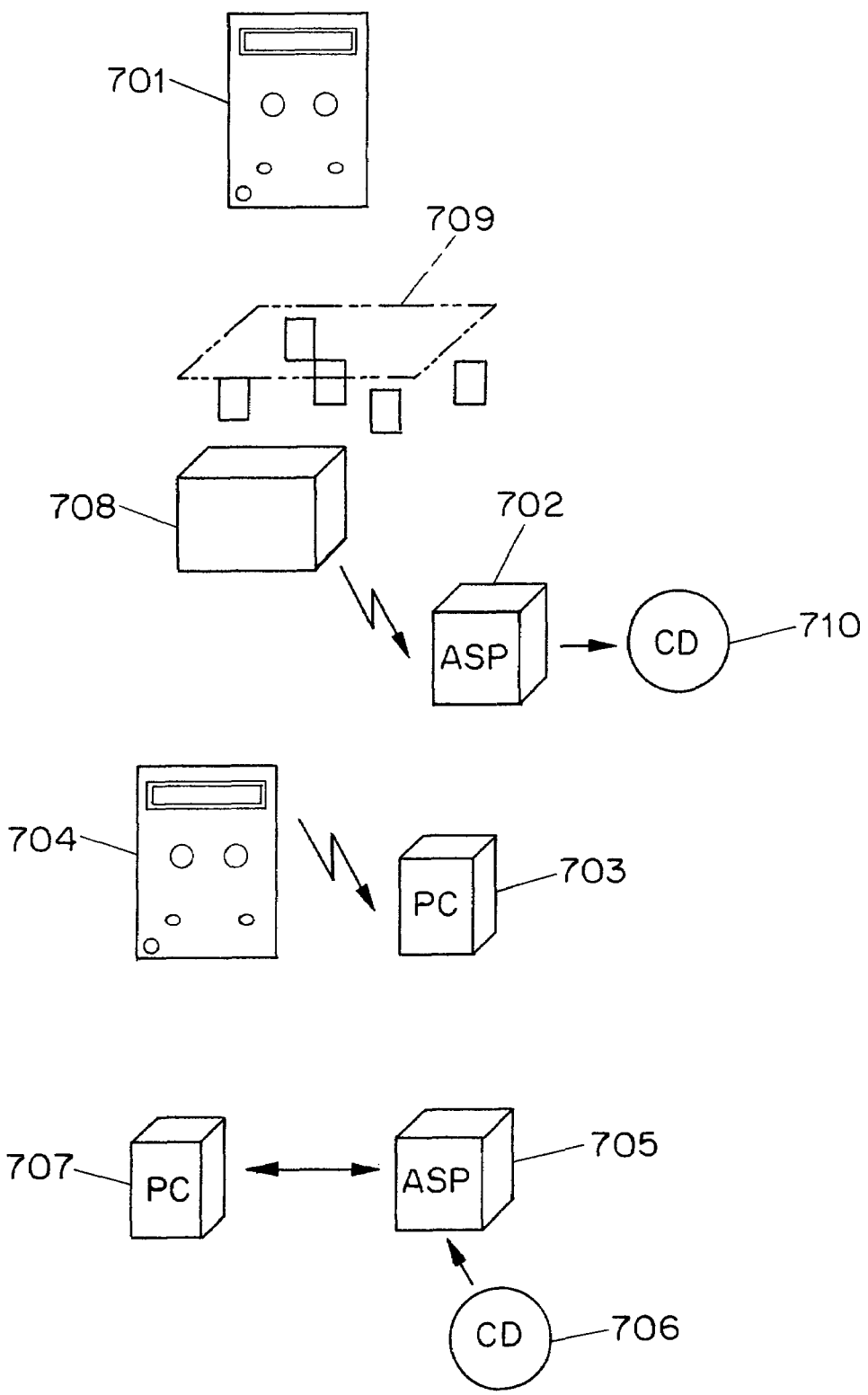
FIG. 7 is a schematic view of two arrangements for collecting auditable, authenticated event data in accordance with the invention. In the upper arrangement, event data are logged together with an algorithm-generated checksum while a checksum is calculated with the same algorithm by the ASP server 702 on data received in real time from the RF tags 701. In the lower arrangement, the data log and checksum are calculated by a PC 703 from RF tags 704 in the repository, while a corresponding check sum is calculated remotely at the ASP server 705, where the data is received from the RF tags and stored on an unalterable CD-R disc 706.
Figure 8:
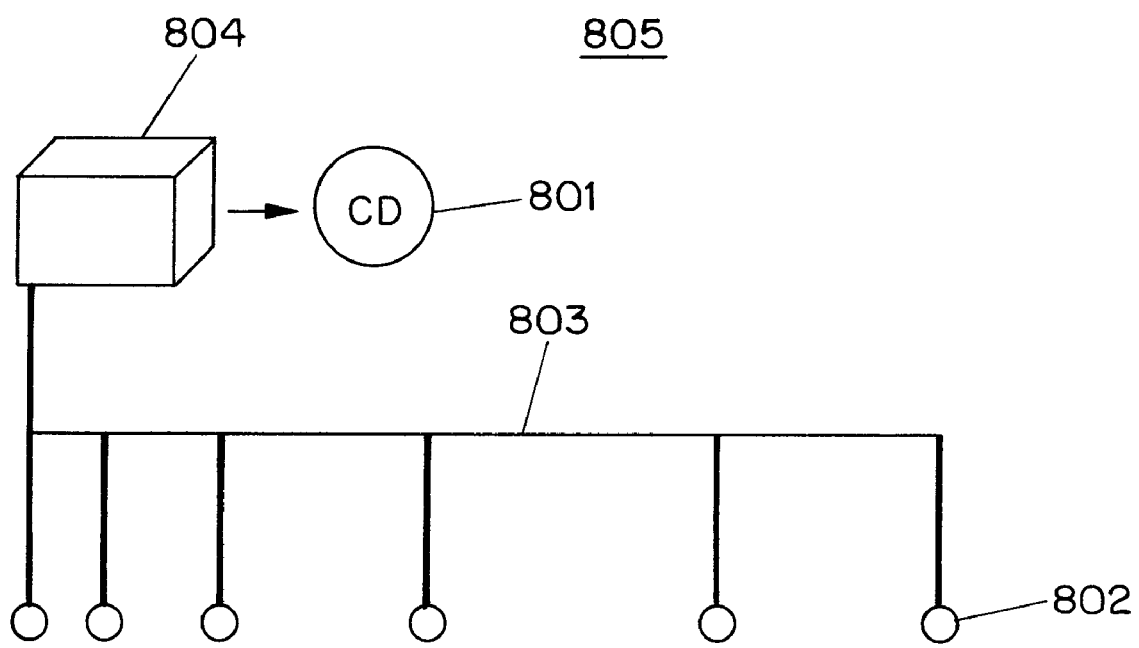
FIG. 8 is a schematic view of an Option 1 in which event data from tags 802 distributed in a repository 805 and connected by cabling 803 to a network device 804 that receives time and/or position signals (e.g. from NIST or GPS) are stored together as a temporally ordered series on a local unalterable CD-R disc 801 drive to which the network device 804 is cabled within the repository.
Figure 9:
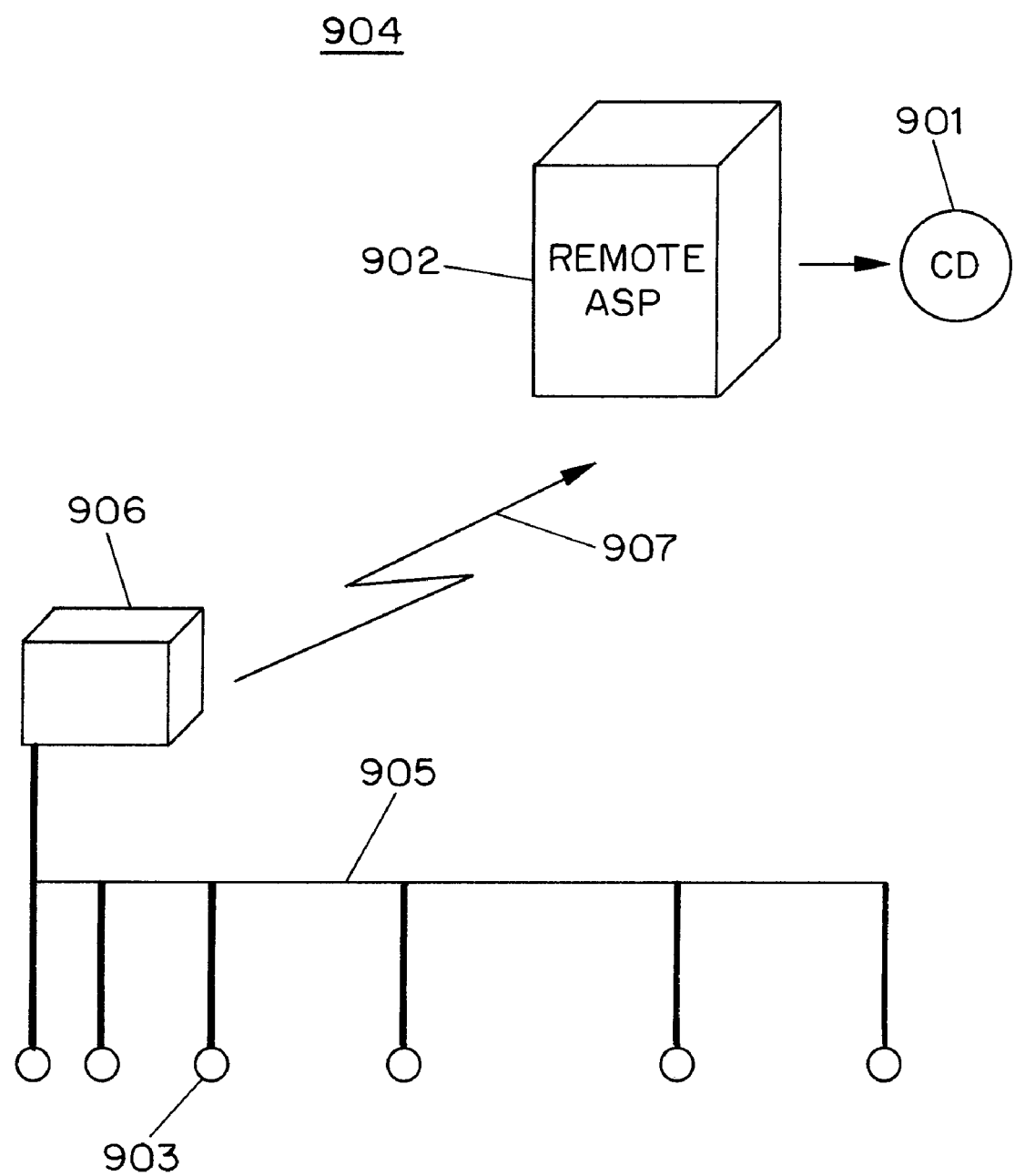
FIG. 9 is a schematic view of an Option 2 in which event data from tags 903 distributed in a repository 904 and connected by cabling 905 to a network device 906 that receives time and/or position signals (e.g. GPS) are transmitted together wirelessly 907 as a temporally ordered series to a remote ASP 902 that receives NIST time data and records event and corresponding time data on an unalterable CD-R disc 901 drive located at the remote ASP server 902.
Figure 10:
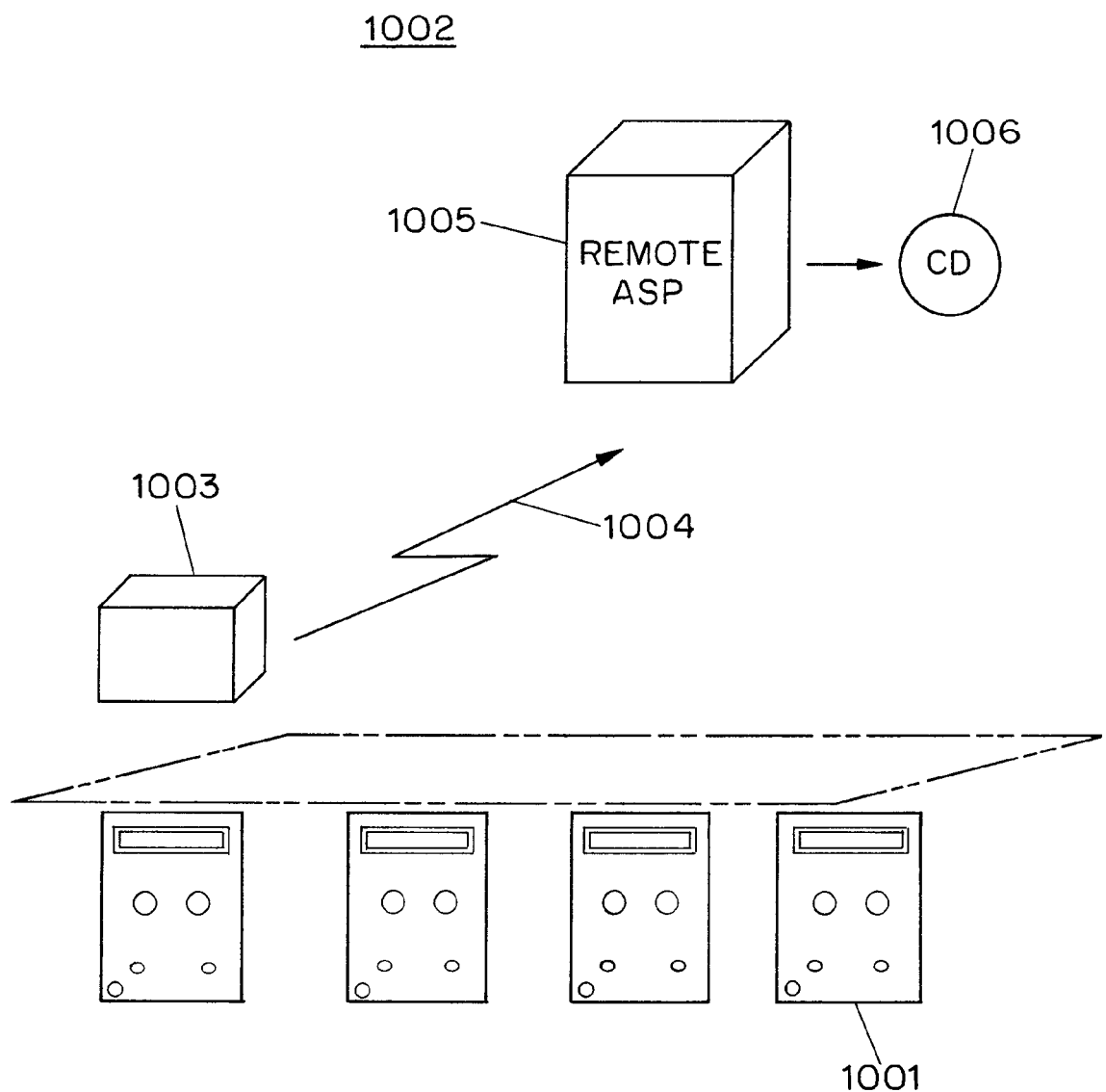
FIG. 10 is a schematic view of an Option 3 in which event data from RF tags 1001 distributed in a repository 1002 and communicating by wireless RF to a network device 1003 that receives time and/or position signals (e.g. GPS) are transmitted together wirelessly 1004 as a temporally ordered series to a remote ASP 1005 that receives NIST time data and records event and corresponding time data on an unalterable CD-R disc drive 1006 located at the remote ASP server 1005.

As shown in FIG. 7, at the end of the run the tag may use an algorithm to calculate and display a checksum based on the temperatures experienced at the tag. The ASP can independently calculate a checksum using the same algorithm based on its permanent record of the data stored at the ASP. In the simplest form of the system, these checksums will simply be compared upon delivery to confirm that the temperature is accurate and that the temperature has not exceeded pre-set standards. As will be understood, this data may be stored permanently on a write-once-only CD-R disk 706, 710 at the ASP's data storage apparatus and even archived by an independent auditor (e.g. KPMG) who would have exclusive access to the CD-R disc.

An alternative method may be to remove the tags from the freight, and then to harvest the log contained in each tag by way of a PC at the delivery site. The PC may, of course, be connected to the ASP server via the Internet where the PC cannot, in real-time, readily compare the tag log as well as the ASP. Moreover, a report that has been independently audited can be printed on the site to confirm that the shipment is acceptable, within a few minutes after arrival.

It is also possible to record the data log in a data storage apparatus located on the truck if a write-once-only CD-R disc is used to prevent alteration by improperly motivated individuals. In that case, care must be taken to prevent any compromise of the audit trail since the computer in the truck may be exposed to tampering before the data is recorded on the CD-R disc (e.g. by the driver or other individuals who own the shipment).

While the present invention has been described with reference to preferred embodiments thereof, numerous obvious changes and variations may readily be made by persons skilled in the art of environmentally sensitive shipping and storage. Accordingly, the invention should be understood to include all such variations to the full extent embraced by the claims.

What is claimed is:

1. A method for preventing alteration of event histories for objects held in a repository for a period of time, said objects being sensitive to events experienced thereby, said method comprising:

a) sensing an event experienced by a said object;
b) recording an event signal that defines the sensed event;
c) transmitting a temporally ordered series of said event signals to a data storage apparatus, said data storage apparatus being operable to store said temporally ordered series of said event signals; and
d) safeguarding said data storage apparatus against alteration of said stored series of event signals wherein said sensing step (a) and recording step (b) are carried out by associating a tag with said object, said tag comprising an event sensor operable to record an event signal for describing an event experienced by said object, a data storage device operable to store data comprising identification data for identifying said radio frequency tag, said tag being operable to provide data signals comprising said event signal and an identification signal based upon said identification data, and an energy source for activating said event sensor and said data storage device.

2. A method as set forth in claim 1, wherein safeguarding step (d) is carried out by selecting a data storage apparatus which is operable to store said series of event signals upon a medium that cannot be readily altered without detection.

3. A method as set forth in claim 2, wherein said repository is a vehicle operable for delivery of said objects, and wherein said medium is a write-once-only CD-Recordable (CD-R) disc.

4. A method as set forth in claim 1, wherein safeguarding step (d) is Carried out by disposing said data storage apparatus at a secure location distant from said object.

5. A method as set forth in claim 4, wherein said safeguarding step (d) utilizes a selected algorithm to calculate a pair of checksums based on a selected sequence of event signals, said pair of checksums having a selected relationship in the event of data integrity, one of said checksums being calculated from event signals generated at said repository, the other checksum being calculated from event signals transmitted to said data storage apparatus.

6. A method as set forth in claim 4, wherein transmitting step (c) is carried out by transmitting said event signals to said data storage apparatus immediately upon recording thereof in accordance with step (b).

7. A method as set forth in claim 1, wherein safeguarding step (d) comprises storage of corresponding temporal data together with each said event signal, said temporal data being obtained from an independent source.

8. A method as set forth in claim 7, wherein safeguarding step (d) is carried out by selecting a data storage apparatus which is operable to store said series of event signals upon a medium that cannot be readily altered without detection, wherein said repository is a vehicle operable for delivery of said objects, wherein said medium is a write-once-only CD-Recordable (CD-R) disc, and wherein said independent source is a global positioning system (GPS) satellite.

9. A method as set forth in claim 8, a plurality of said tags being disposed in different areas of said vehicle to sense different events experienced in said different areas.

10. A method as set forth in claim 1, wherein the object comprises a pharmaceutical material, foodstuff or wine.

11. A method for preventing alteration of event histories for objects held in a repository for a period of time, said objects being sensitive to events experienced thereby, said method comprising: a) associating a radio frequency (RF) tag with said object, said tag comprising an event sensor operable to record an event signal for describing an event experienced by said object, a data storage device operable to store data comprising identification data for identifying said radio frequency tag, a tag antenna operable at a radio frequency, a tag transmitter operatively connected to said tag antenna, said tag transmitter being operable at said radio frequency to transmit data signals comprising said event signal and an identification signal based upon said identification data, and an energy source for activating said event sensor and said tag transmitter; b) reading said data signals, which comprise said event signal and said identification signal, from said tag transmitter of said RF tag; and c) transmitting said data signals to a data storage apparatus, said data storage apparatus being operable to store a temporally ordered sequence of said event signals from said RF tag upon a medium which cannot be readily altered without detection.

12. A method as set forth in claim 11, said data storage apparatus being disposed at a secure location distant from said object, said transmitting step (c) further comprising:

transmitting said sequence of event signals together with corresponding identification signals to said data storage apparatus.

13. A method as set forth in claim 11, said method comprising a step of utilizing a selected algorithm to calculate a pair of checksums based on a selected sequence of event signals, said pair of checksums having a selected relationship in the event of data integrity, one of said checksums being calculated from event signals generated at said repository, the other checksum being calculated from event signals transmitted to said data storage apparatus.

14. A method as set forth in claim 11, wherein the object comprises a pharmaceutical material, foodstuff or wine.

15. A system for preventing alteration of event histories for objects held in a repository for a period of time, said objects being sensitive to events experienced thereby, said system comprising: a) a tag carried by said object, said tag comprising an event sensor operable to record an event signal for describing an event experienced by said object, a data storage device operable to store data comprising identification data for identifying said tag, a tag transmitter operable to transmit data signals comprising said event signal and an identification signal based upon said identification data, and an energy source for activating said event sensor and said data storage device; and b) a data storage apparatus in operative communication with said tag, said data storage apparatus being operable to store a temporally ordered sequence of said event signals upon a medium which cannot be readily altered without detection.

16. A system as set forth in claim 15, and further comprising a central data processor, each tag being connected by cable to said central data processor.

17. A system as set forth in claim 15, wherein the object comprises a pharmaceutical material, foodstuff or wine.

18. A system for preventing alteration of event histories for objects held in a repository for a period of time, said objects being sensitive to events experienced thereby, said system comprising: a) a radio frequency (RF) tag carried by a said object, said tag comprising an event sensor operable to record an event signal for describing an event experienced by said object, a data storage device operable to store data comprising identification data for identifying said radio frequency tag, a tag antenna operable at a radio frequency, a tag transmitter operatively connected to said tag antenna, said tag transmitter being operable at said radio frequency to transmit data signals comprising said event signal and an identification signal based upon said identification data, and an energy source for activating said event sensor and said tag transmitter; b) at least one field antenna disposed at an orientation and within a distance from said object that permit effective communication with said RF tag at said radio frequency; c) a reader in operative communication with said field antenna, said reader being operable to receive data signals from said RF tag; and d) a data storage apparatus in operative communication with said reader, said data storage apparatus being operable to store a temporally ordered sequence of said event signals upon a medium which cannot be readily altered without detection.

19. A system as set forth in claim 18, said data storage apparatus being disposed at a secure location distant from said object, said system further comprising: e) a field transmitter disposed at said repository and operable to transmit said event signals and corresponding location signals to said data storage apparatus.

20. A system as set forth in claim 18, said system comprising a pair of checking devices for utilizing a selected algorithm to calculate a corresponding pair of checksums based on a selected sequence of event signals, the pair of checksums having a selected relationship in the event of data integrity, one of said checking devices being disposed at said repository, the other checking device being disposed at said data storage apparatus.

21. A system as set forth in claim 18, said tag further comprising a tag receiver operable to receive an RF interrogation signal from said field antenna, said RF interrogation signal being operable to cause said tag to emit an event signal.

22. A system for preventing alteration of event histories for objects held in a movable repository for a period of time, said objects being sensitive to events experienced thereby, said system comprising: a) a radio frequency (RF) tag carried by a said object, said tag comprising an event sensor operable to record an event signal for describing an event experienced by said object, a data storage device operable to store data comprising identification data for identifying said radio frequency tag, a tag antenna operable at a radio frequency, a tag transmitter operatively connected to said tag antenna, said tag transmitter being operable at said radio frequency to transmit data signals comprising said event signal and an identification signal based upon said identification data, and an energy source for activating said event sensor and said tag transmitter; b) at least one field antenna disposed at an orientation and within a distance from said object that permit effective communication with said RF tag at said radio frequency; c) a reader in operative communication with said field antenna, said reader being operable to receive data signals from said frequency tag; d) a geographic position sensing (GPS) detector operable to record a location signal defining a geographic position of said movable repository, and d) a data storage apparatus in operative communication with said reader and said GPS detector, said data storage apparatus being operable to store a temporally ordered sequence of said event signals and corresponding location signals upon a medium which cannot be readily altered without detection.

23. A system as set forth in claim 22, said data storage apparatus being disposed at a secure location distant from said object, said system further comprising: e) a field transmitter disposed at said movable repository and operable to transmit said event signals and corresponding location signals to said data storage apparatus.

24. A system as set forth in claim 23, said system further comprising a clock operable to generate time signals for transmittal to said data storage apparatus and for storage thereat in correspondence with said event signals.

25. A system as set forth in claim 24, said clock being disposed at said RF tag.

26. A system as set forth in claim 24, said clock being disposed at said data storage apparatus.

27. A system as set forth in claim 24, said data storage apparatus comprising a write-only-once device to assure integrity of data relating to events experienced by objects.

28. A system as set forth in claim 22, said system comprising a pair of checking devices for utilizing a selected algorithm to calculate a corresponding pair of checksums based on a selected sequence of event signals, the pair of checksums having a selected relationship in the event of data integrity, one of said checking devices being disposed at said movable repository, the other checking device being disposed at a secure location distant from said movable repository.

29. A system as set forth in claim 28, said one checking device being disposed on said RF tag.

30. A system as set forth in claim 28, said tag further comprising a display operable to display visible data relating to said event sensor of said tag.

31. A system as set forth in claim 30, said visible data comprising one of said checksums.

32. A system as set forth in claim 22, said movable repository further comprising a central data processor in operative communication with said field antenna, said tag further comprising a tag receiver operable to receive an RF interrogation signal from said field antenna, said RF interrogation signal being operable to cause said tag to emit an event signal.

33. A system as set forth in claim 32, wherein said identification data comprises an internet protocol (IP) address, and wherein said central data processor is operable for communication with an internet router.

34. A system as set forth in claim 22, said system comprising a plurality of said low frequency RF tags and a plurality of low frequency field antennas disposed in different areas of said movable repository and operable to enable discrimination of event signals received from RF tags disposed in different areas.

35. A system as set forth in claim 22, wherein the object comprises a pharmaceutical material, foodstuff or wine.

36. A method for preventing alteration of event histories for objects held in a repository for a period of time, said objects being sensitive to events experienced thereby, said method comprising: a) sensing an event experienced by said object upon a tag associated therewith; b) unalterably recording an event signal that defines the sensed event upon a write-once-only data storage device that is part of said tag; c) transmitting a temporally ordered series of said event signals to a data storage apparatus, said data storage apparatus being operable to store said temporally ordered series of said event signals; and d) safeguarding said data storage apparatus against alteration of said stored series of event signals.

37. A tag for use in system for preventing alteration of event histories for objects held in a repository for a period of time, said objects being sensitive to events experienced thereby, said tag being adapted for association with a said object, said tag comprising an event sensor operable to record an event signal for describing an event experienced by said object, a write-once-only data storage device operable to store, in an unalterable manner, data comprising said event signal, a tag transmitter operable to transmit data signals comprising said event signal, and an energy source for activating said event sensor and said write-once-only data storage device.

38. A tag as set forth in claim 37, said write-once-only data storage device being operable to store identification data for identifying said tag.

39. A tag as set forth in claim 38, said tag further comprising a clock operable to generate time signals for storage at said write-once-only data storage device in correspondence with said event signals.

* * * * *

UNITED STATES PATENT AND TRADEMARK OFFICE
CERTIFICATE OF CORRECTION

PATENT NO. : 7,564,353 B2  Page 1 of 1
APPLICATION NO. : 11/164213
DATED : July 21, 2009
INVENTOR(S) : Stevens et al.

It is certified that error appears in the above-identified patent and that said Letters Patent is hereby corrected as shown below:

Column 8, Line 50, Claim 1 should read --… a) sensing an event experienced by said object …--

Column 9, Line 10, Claim 4 should read --… step (d) is carried out by disposing said data storage apparatus …--

Signed and Sealed this

First Day of September, 2009

David J. Kappos
*Director of the United States Patent and Trademark Office*